(12) United States Patent
Kuroda (10) Patent No.: US 6,201,567 B1
(45) Date of Patent: Mar. 13, 2001

(54) TURN BROACH ABNORMALITY SENSING APPARATUS

(75) Inventor: Yoshiaki Kuroda, Ishikawa-ken (JP)

(73) Assignees: Komatsu Ltd., Tokyo; Komatsu Machinery Corp., Ishikawa-ken, both of (JP)

( * ) Notice: Subject to any disclaimer, the term of this patent is extended or adjusted under 35 U.S.C. 154(b) by 0 days.

(21) Appl. No.: 09/091,161

(22) PCT Filed: Dec. 19, 1996

(86) PCT No.: PCT/JP96/03713

§ 371 Date: Jun. 9, 1998

§ 102(e) Date: Jun. 9, 1998

(87) PCT Pub. No.: WO97/22438

PCT Pub. Date: Jun. 26, 1997

(30) Foreign Application Priority Data

Dec. 20, 1995 (JP) .................................................. 7-331732

(51) Int. Cl.[7] .................................................... H04N 7/18
(52) U.S. Cl. ............................. 348/86; 82/1.11; 382/152; 700/175
(58) Field of Search ............................... 348/61, 86, 92, 348/94, 95; 382/152; 82/1.11; 409/244; 700/175, 176; 702/182, 183, 184, 185, 186; H04N 7/18

(56) References Cited

U.S. PATENT DOCUMENTS

| | | | |
|---|---|---|---|
| 3,902,281 | * | 9/1975 | McCord et al. ...................... 451/220 |
| 4,784,534 | * | 11/1988 | Kaminski et al. ................. 82/106 X |
| 4,801,226 | * | 1/1989 | Gleason ............................. 82/1.11 X |
| 4,841,820 | * | 6/1989 | Kaminski et al. ..................... 82/1.11 |
| 4,895,057 | * | 1/1990 | Berstein et al. ........................ 82/106 |
| 5,255,199 | * | 10/1993 | Barkman et al. ................. 382/152 X |

FOREIGN PATENT DOCUMENTS

| | | |
|---|---|---|
| 61-111877 | 5/1986 | (JP) . |
| 61-252051 | 11/1986 | (JP) . |
| 62-74553 | 4/1987 | (JP) . |
| P64-45549 | 2/1989 | (JP) . |
| P04-255836 | 9/1992 | (JP) . |
| P05-31849 | 4/1993 | (JP) . |
| 6-39685 | 2/1994 | (JP) . |
| P06-114694 | 4/1994 | (JP) . |

* cited by examiner

Primary Examiner—Howard Britton
(74) Attorney, Agent, or Firm—Ronald P. Kananen; Rader, Fishman & Grauer

(57) ABSTRACT

A turn broach abnormality sensing apparatus is provided for use in a turn broach for cutting a rotating workpiece (3) by rotating a broach cutter (18) that comprises a plurality of unitary cutters (18b) axially coupled together, each having a plurality of tip rows ($18_1$, $18_2$, . . . $18_n$) arranged on, a peripheral surface thereof in the form of a helicoid. The abnormality sensing apparatus includes a plurality of image pickup means (23) disposed corresponding respectively to the unitary cutters ($18_1$, $18_2$, . . . $18_n$) of the broach cutter (18b) for sensing an image of each of individual tips on the respective tip row of each of the plural unitary cutters, a focusing adjustment means (27) for maintaining a distance between the image pickup means (23) and each individual tip on the respective tip row of each of the unitary cutters, substantially constant, and an abnormality sensing means for image processing the image picked up by the image pickup means (23) of each individual tip to determine an extent of wear thereof or damage thereto, thereby ascertaining an abnormality of each of the individual tips.

5 Claims, 5 Drawing Sheets

(a) PULSE SIGNALS FROM ROTARY ANGLE SENSING MEANS (b) PULSE SIGNAL COUNTING (c) TRIGGER PULSES (d) IMAGE PICKUP MEANS SHUTTER OPENING (e) IMAGE PICKING UP (f) IMAGE PROCESSING

TURN BROACH ABNORMALITY SENSING APPARATUS

TECHNICAL FIELD

The present invention relates to a turn broach abnormality sensing apparatus and, more particularly, to an apparatus for use in a turn broach machine and for sensing an abnormality in a broach cutter tool precisely with no touch, which may occur from time to time in the course of an operation of the machine.

BACKGROUND ART

In the machining operation of a workpiece by a cutting tool having a large number of edges (tips) as represented by a broach cutter tool, if even a single workpiece is damaged or suffers an abnormal wear, for example, when an abnormality is produced therein, the workpiece in the operation can no longer be machined satisfactorily or with a due precision since vibrations are generated therein and may result in an excessive load applied in other normal tips, bringing about a damage to or an abnormal wear of such other tips.

In order to eliminate such an inconvenience, various methods and means have been proposed in the art for detecting a damage to or abnormal wear of a cutting tip in the course of a machining operation.

For example, Japanese Unexamined Patent Publication No. Sho 61-111877 and No. Sho 62-74553 (Japanese Patent Publication No. Hei 1-33299) have disclosed a "tip damage detector" or a "cutting tool abnormality sensing method", designed to detect an abnormality in a cutting tool by sensing vibrations which are generated when a tip is damaged.

Also, Japanese Unexamined Patent Publication No. Sho 61-252051 proposed a "tip damage sensing apparatus" that is intended to optically detect tip damage in response to a signal sensed from a tip by a photoelectric switch having an optical fiber in combination with a signal derived from a tip mounting position sensing circuit.

Furthermore, Japanese Unexamined Patent Publication No. Hei 6-39685 has proposed a "cutting tool damage sensing apparatus" which is designed to detect wear of or damage to a cutting tool using an image pickup means such an optical sensor or a TV camera.

An abnormality sensing method or apparatus of the type disclosed in Japanese Patent Publication No. Sho 61-111877 and No. Sho 62-74553 mentioned above, in which the detection of vibrations caused by damage to or abnormal wear of a tip have been found to be inconvenient when used in a finish machining operation where a cutting rate is low and thus tool damage or an abnormality is seldom followed by vibrations as described and hence is hard to be detected.

A difficulty in detecting a tool abnormality is especially acute in a turn broach machine (herein simply referred to "turn broach"). The turn broach uses a cutting tool (herein referred to as "broach cutter"), having tool tips mounted in a plurality of rows, where vibrations caused by a tip abnormality are superimposed one upon another. Hence, such a tool abnormality is hardly identifiable with respect to which particular tip upon which the vibration has occurred.

As a result, when a tool abnormality is identified, the particular tip containing the abnormality, of as much as several hundreds tips, must be located without requiring a large number of steps.

On the other hand, an abnormality sensing apparatus of the type disclosed in Japanese Unexamined Patent Publication No. Sho 61-25205 and No. Hei 6-39685 and designed to detect a tip abnormality by a photoelectric switch with an optical fiber or an image pickup means has been found to be inconvenient in that a tip abnormality can only be detected with difficulty if the tip is fine so as to be detected with an unsatisfactory degree of precision. When the surface of a tip used to produce a light reflection to be detected is thermally oxidized by heat generated during a cutting operation and is thereby blackened, its reflectivity will be sharply reduced so that sensing its abnormality may no longer be possible.

Furthermore, an image pickup means in the prior art system has been found to be impractical when used to sense an abnormality of a broach cutter in a turn broach having tool tips varied in position diametrically with respect to its center of rotation where the image pickup means cannot be kept focused on a workpiece cutting tool tip as the broach cutter is rotated causing the image pickup means to be variably distant from the tool tip and thus rendering the image pickup means defocused even if the image pickup means is focused on the workpiece cutting tool tip firstly.

It is accordingly an object of the present invention to eliminate these conventional difficulties and to provide a turn broach abnormality sensing apparatus of a non-contact type in a broach cutter in which a plurality of tips are arranged eccentrically with their eccentricity varying in succession.

SUMMARY OF THE INVENTION

In order to achieve the above mentioned object, there is provided in accordance with the present invention in a certain aspect thereof a turn broach abnormality sensing apparatus for use in a turn broach for cutting, a rotating workpiece by rotating a broach cutter that comprises a plurality of unitary cutters axially coupled together, each having a row of tips arranged on a peripheral surface thereof in the form of a helicoid, which apparatus comprises: a plurality of image pickup means disposed corresponding respectively to the unitary cutters of the broach cutter; a focusing adjustment means operative while the broach cutter is being rotated for maintaining a distance between each individual tip on the row of each of the unitary cutters and the image pickup means corresponding thereto substantially constant; and an abnormality sensing means for image processing the image picked up by the image pickup means of each of the individual tips to determine an extent of wear thereof or damage thereto, thereby ascertaining an abnormality of each of the individual tips.

According to the invention mentioned above, it can be seen and should be understood that a broach cutter can be emergently stopped upon sensing a tip abnormality without undergoing any inconvenience as caused in the prior art that other normal tips may be damaged one after another.

Still advantageously, by virtue of the focusing adjustment means, acting while the broach cutter is being rotated, to maintain a distance between each individual tip on the tip row of each of the unitary cutters, and by virtue of the image pickup means corresponding thereto substantially constant, even where the tips are arranged spirally with respect to a center of rotation of the cutter as are characteristic of a broach cutter, it becomes altogether possible to pick up the image of each individual with a due clarity and sharpness, thereby permitting detection of a cutter abnormality with an increased accuracy.

The apparatus also assures detection without fail of a tip abnormality, even slight or in an incipient stage, that is developing in tips in a broach cutter. Therefore, possible occurrence of a defective workpiece (product) due to any tip abnormality can effectively be prevented. It is also possible to reduce the possibility of vibrations or noise caused by the tip abnormality, thus giving rise to an improvement in working environments.

Furthermore, it is assured that damage to any single tip can be quickly detected without fail. Hence a thickening of cutting chips as caused by an increase in cutting clearance due to such unnoticed damage can be prevented. This allows machining chips to be readily treated and prevents them from being built up round the workpiece and hence, prevents further damaging of the tip.

In the invention described above, it is desirable that the focusing adjustment means comprise: a mounting table for mounting the plurality of image pickup means thereon; a drive means for displacing the mounting table towards and away from the broach cutter; a rotary angle sensing means for detecting an angle of rotary motion of the broach cutter; and a control means operative in response to a signal received from the rotary angle sensing means for controlling the drive means so as to maintain the distance between the image pickup means and each individual tip on the tip row of each of unitary cutters substantially constant.

According to the invention mentioned above, it can be seen and should be understood that permitting the plural image pickup means disposed respectively to correspond to the plural rows of tips to be capable of being focused at the same time makes it unnecessary to provide an adjustment means separately of individual image sensing means. This markedly simplifies the invention of the focusing adjustment means and allows it to be produced and furnished at a reduced cost.

Furthermore, in the invention described above, it is preferred that there be further provided an abnormality identifying means that is operative in response to a signal received from the rotary angle sensing means for identifying a particular tip at which the abnormality has occurred.

According to the invention mentioned above, it can be seen and should be understood that the ability to automatically identify, among a number of tips on a tool, a particular tip where an abnormality has happened, makes it unnecessary, even with a broach cutter tool as here where various tips are used to constitute each of rows of tips arranged respectively on a plurality of unitary cutters or tools, to entail a manual identification testing operation based on a visual observation as has been mandatory in the prior art. The result is a drastic saving of the time and cost that must have been expended heretofore; hence, a marked enhancement of workablity of a turn broach and consequently its productivity.

Furthermore, in the invention described above, it is desirable that there be further provided an air curtain forming means disposed between the broach cutter and the image pickup means.

According to the invention mentioned above, it can be seen and should be understood that a working site is effectively shielded from cutting chips and fumes which are produced while the workpiece is being cut and splashes of a machining medium and such chips, fumes and splashes are advantageously prevented from adhering to a lens in the image pickup means. As a result, the detection of an abnormality is achieved with no influence by them and hence with due stability and without fail.

Furthermore, in the invention described above, it is preferred that the image pickup means be disposed at a site opposite to where the workpiece is located across the broach cutter.

According to the invention mentioned above, it can be seen and should be understood that at no time can the image pickup means be damaged due to machining chips-or vibrations caused during a cutting operation, or be affected by a noise as caused by sparks that can develop in the cutting zone. As a result, a reliability of the apparatus is advanced.

BRIEF DESCRIPTION OF THE DRAWINGS

The present invention will better be understood from the following detailed description and the drawings attached hereto showing certain illustrative embodiments of the present invention. In this connection, it should be noted that such embodiments as illustrated in the accompanying drawings are intended in no way to limit the present invention, but to facilitate an explanation and understanding thereof.

In the accompanying drawings.

BEST MODES FOR CARRYING OUT THE INVENTION

Hereinafter, suitable embodiments of the present invention with respect to a turn broach abnormality sensing apparatus are set forth with reference to the accompanying drawings hereof.

Figure 1:
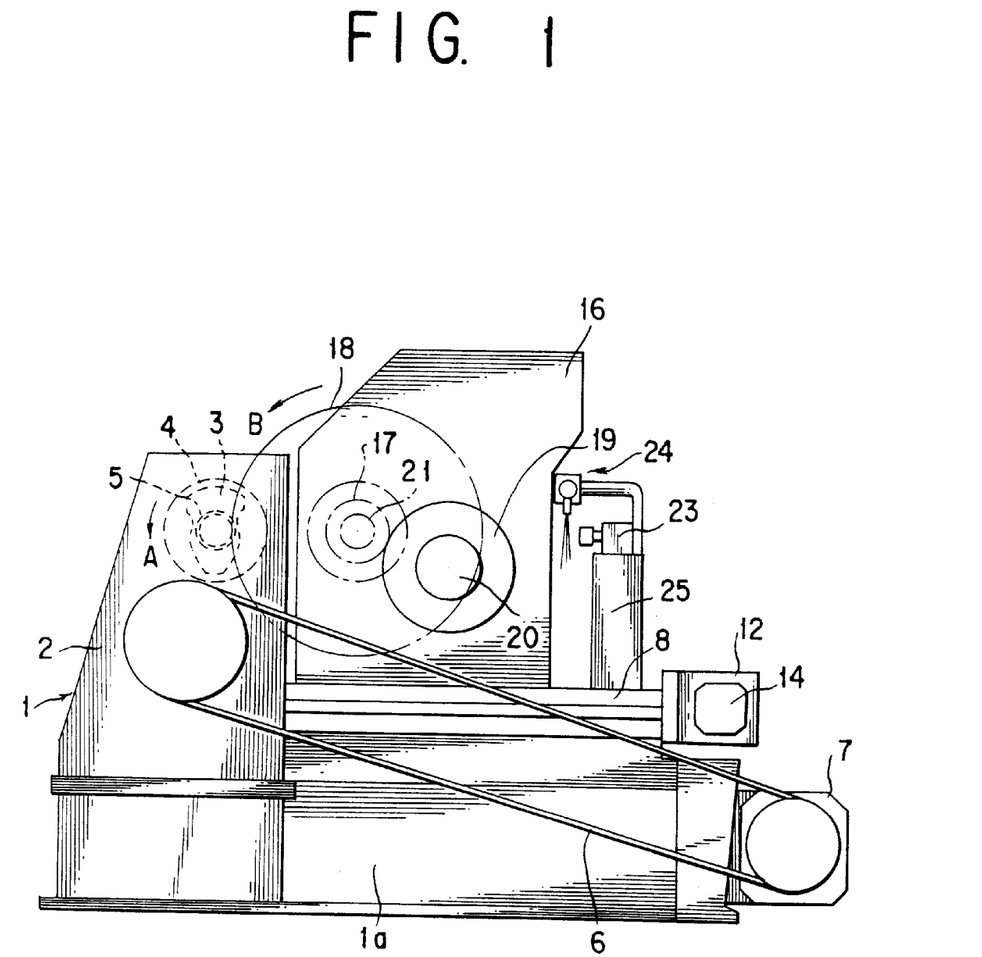
FIG. 1 is a side elevational view showing a turn broach in which an abnormality sensing apparatus that represents a certain embodiment of the present invention, is provided.
Figure 2:
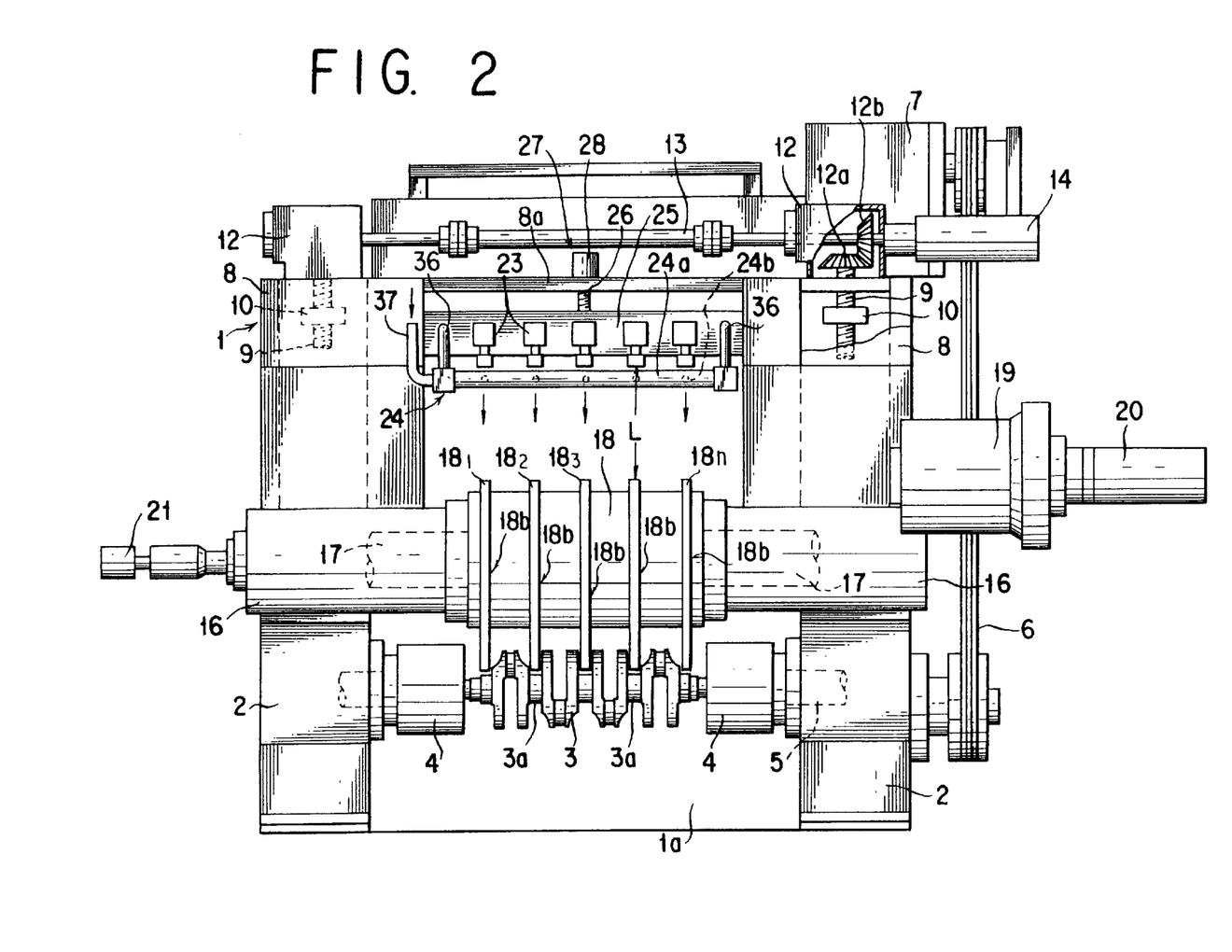
FIG. 2 is a top plan view in part cut away showing in some detail the turn broach shown basically in FIG. 1.
Figure 3:
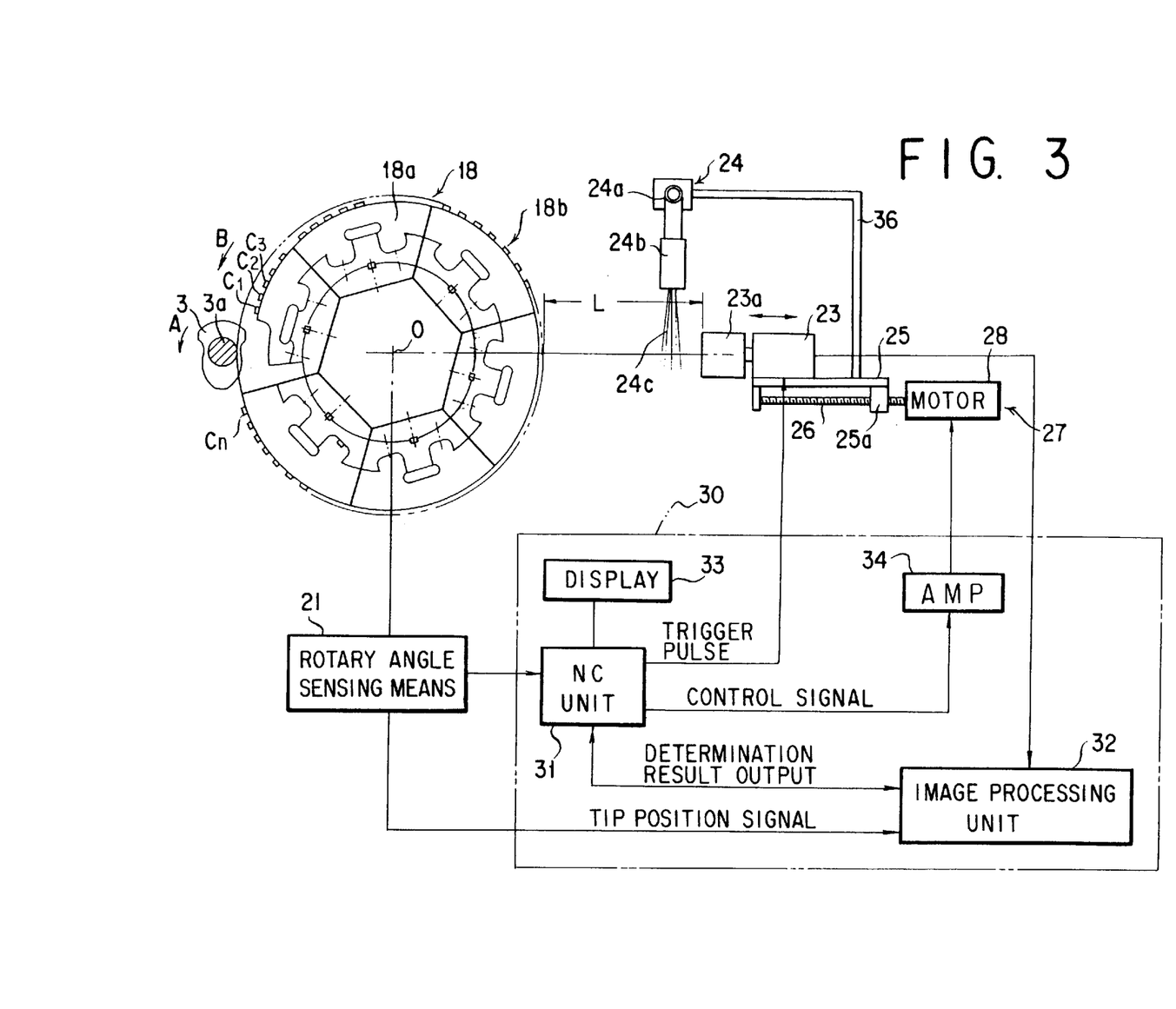
FIG. 3 is a constructive view illustrating the embodiment basically shown in FIGS. 1 and 2.
Figure 4:
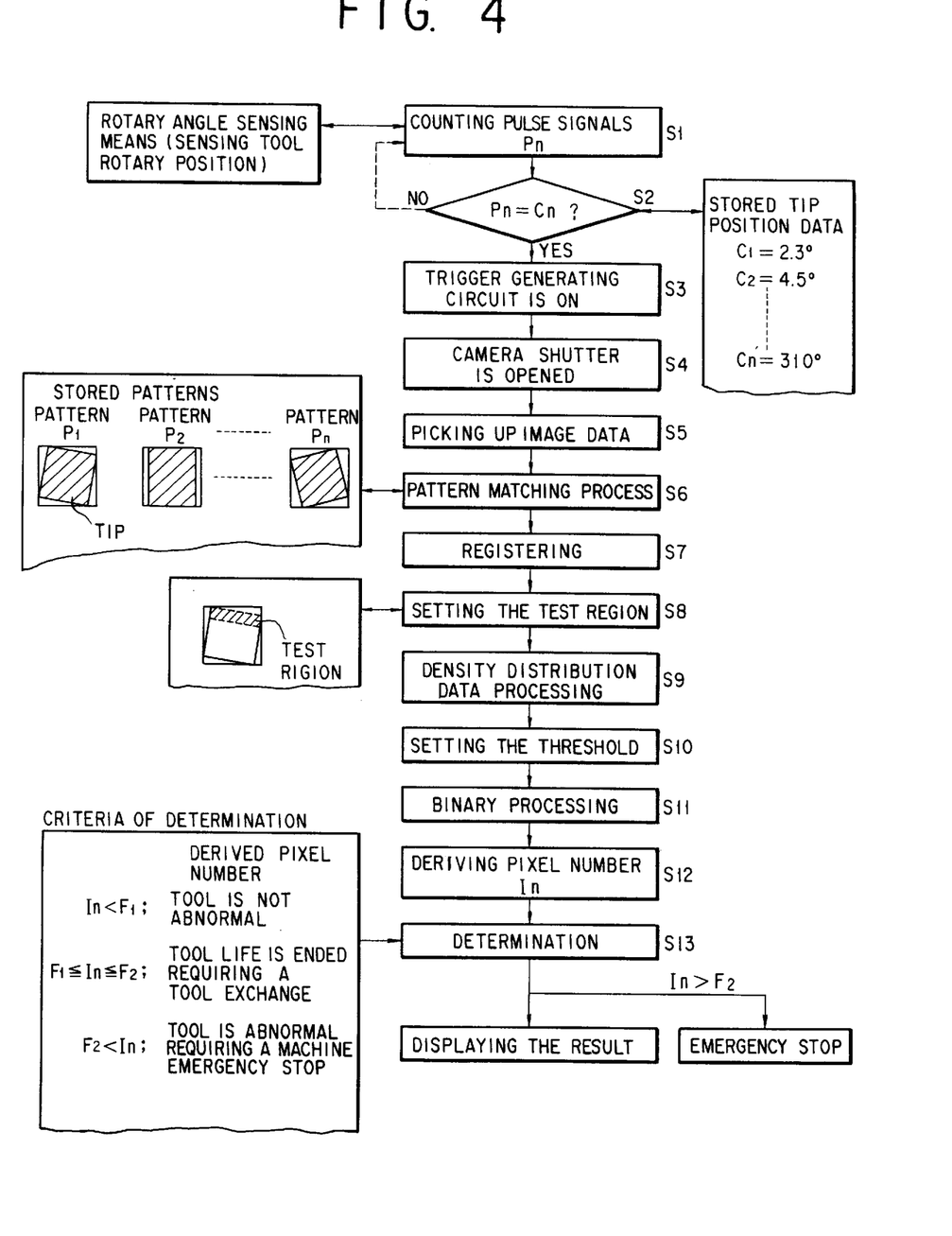
FIG. 4 is a flow chart showing the operation of that embodiment of the present invention.
Figure 5:
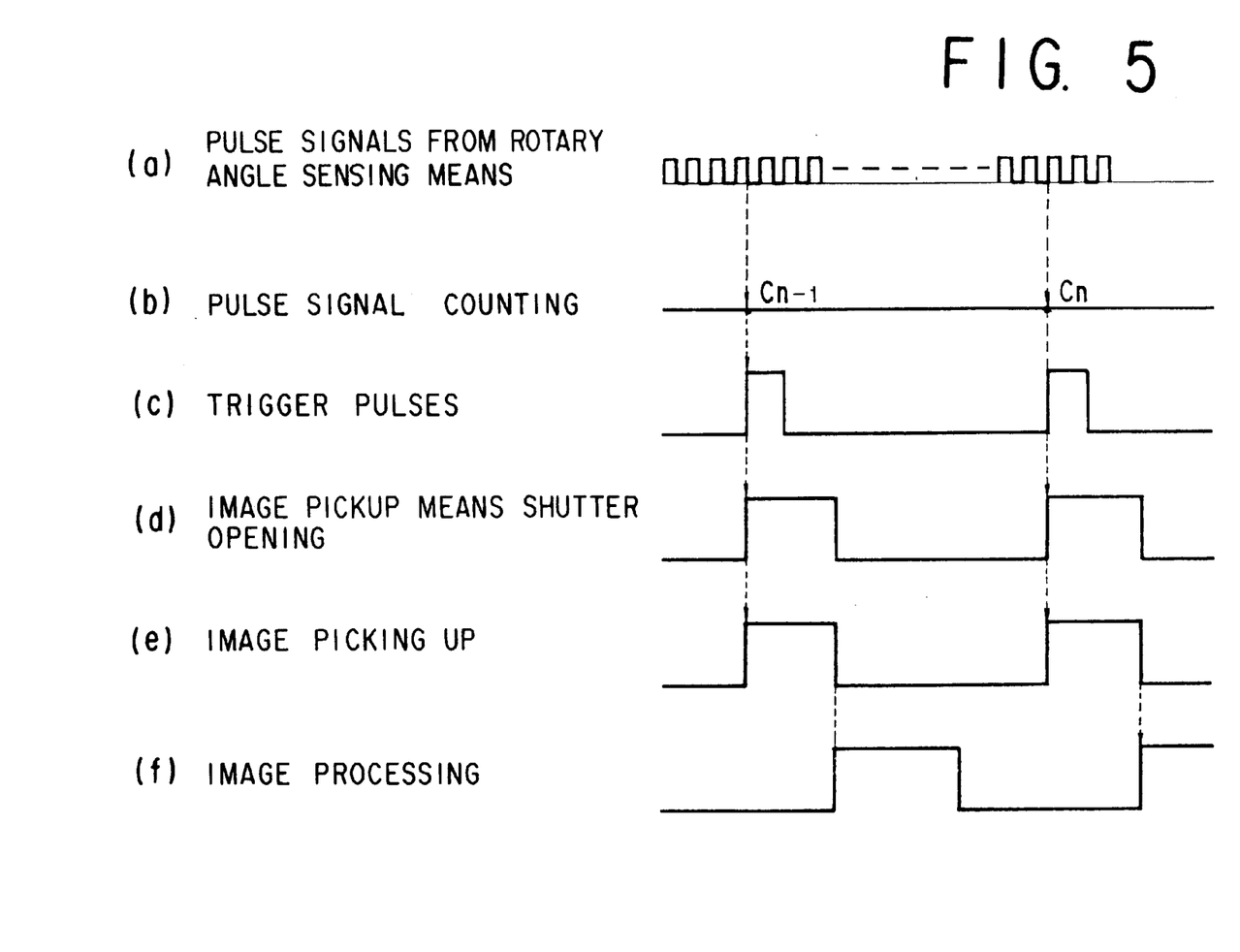
FIG. 5 is a timing chart showing the operation of that embodiment of the present invention.

A preferred embodiment of the present invention will be described in detail with reference to the accompanying drawing in which FIG. 1 is a side elevational view showing a turn broach in which an abnormality sensing apparatus that represents such an embodiment is provided; FIG. 2 is a top plan view in part cut away showing in some detail the turn broach shown in FIG. 1; FIG. 3 is a constructive view illustrating the embodiment shown in FIGS. 1 and 2; FIG. 4 is a flow chart showing the operation of that embodiment of the present invention; and FIG. 5 is a timing chart showing the operation of that embodiment of the present invention.

Referring to FIGS. 1 and 2, a turn broach comprises a machine body 1 having a, bed la on which a pair of work heads 2 are mounted as horizontally spaced apart from each other.

The work heads 2 have their respective faces opposing to each other and provided with a pair of chucks 4, respectively, for holding the two ends of a workpiece 3, thereby positioning and carrying it therebetween. A spindle 5 provided with the chuck 4 has one end thereof connected via an endless belt 6 to a workpiece drive motor 7 which acts to rotate the workpiece 3 in the direction indicated by the arrow A in FIG. 1 via the spindle 5 and the chucks 4.

On the bed la there are also provided a pair of movable slides 8 and 8 as horizontally spaced apart from each other each of which is displaceable in the directions orthogonal to the longitudinal direction of the workpiece 3. These slides 8 and 8 in pair are integrally coupled together by a cross bar 8a.

Disposed under slides 8 and 8 are a pair of feed screws 9 and 9, which includes a ball screw, and are rotatable and displaceable axially. They carry a pair of nut members 10 respectively in screw therewith which are secured to the respective lower surface of the slides 8.

Secured to the rear ends of the feed screws 9 and 9 are bevel gears 12a and 12a which are each housed in a bevel gear box 12 attached to the rear face of the bed 1a.

Each of the bevel gear boxes 12 and 12 is traversed by a drive shaft 13 therein that extends in a direction orthogonal to those of the feed screws 9. The drive shaft 13 has a pair of bevel gears 12b and 12b secured thereto which are in mesh with the bevel gears 12a and 12a, respectively, and has one end coupled to a slide drive motor 14. Thus, the feed screws 9 and 9 are rotatable by the slide drive motor 14 via the drive shaft 13 and the bevel gears 12b and 12a so as to allow the left hand side and right hand side slides 8 and 8 to be displaced together in the direction in which the work heads 2 and 2 are spaced apart from each other.

Also, a cutter head 16 is mounted on the upper surface of each of the slides 8, respectively.

Within each of such cutter heads 16 and 16 there is rotatably supported a rotary shaft 17 in a direction parallel to the spindle 5 in the work heads 2. And, a broach cutter 18 in the form of a drum is detachably mounted between these rotary shafts 17 and 17 as secured to their opposing ends.

One of these rotary shafts 17 has at its other end a broach cutter drive motor 20 coupled thereto via a gear reducer 19, the motor 20 acting to allow the broach cutter 18 to be rotated during a cutting operation in the direction indicated by the arrow in FIG. 1. And, the other rotary shaft 17 has at its other end a rotary angle sensing means 21 such as a rotary encoder coupled thereto for sensing the angle of rotation of the rotary shafts 17.

On the other hand, the broach cutter 18 is constructed of a plurality of unitary cutters 18b which as shown in FIG. 3, are axially coupled together. Here, the unitary cutter 18b is constructed of a plurality of circumferentially arranged segments 18a, each of which has an outer periphery constituted by a helical or spiral surface, or a helicoid, such surfaces here having diameters increased progressively with respect to a center of rotation 0 of the unitary cutters 18b.

The broach cutter 18 is designed to provide a segment 18a with a smallest outer diameter having a plurality of rough machining tips C1, C2, C3, . . . , a segment 18a with a greater diameter having a plurality of medium machining tips and a segment with a greatest outer diameter having a plurality of finish machining tips . . . Cn, the tips being detachably secured on their respective outer peripheral surfaces in order, and is thus adapted to carry out a cutting operation covering from rough to finish machining ranges while it is rotated one turn.

Also, located at a position opposing the workpiece 3 across the broach cutter 18 there are also provided an image pickup means 23 and an air curtain forming means 24.

The image pickup means 23 is constituted of, for example, a CCD camera and may be plurality of such securely positioned on a mounting table 25 so as to correspond to a plurality of tip rows $18_1$, $18_2$ . . . , $18_n$, on the unitary cutters 18b constituting the broach cutter 18.

The image pickup means 23 as carried on the mounting table 25 is driven in response to a signal representing an angle of rotation of the broach cutter 18, that is, a tip position indicating signal which is furnished from the rotary angle sensing means 21 via a control means 30 that will be described later. An image picked up by the image pickup means 23 of an image of each individual tip C1, C2, . . . , Cn on the corresponding tip row $18_1$, $18_2$, . . . , $18_n$, is furnished to an image processing unit 32 in the control means 30 as will be described later.

The tips C1, C2, . . . , Cn on the outer peripheral surfaces of the unitary cutters 18b of the broach cutter 18 are arranged spirally on the latter so that they become progressively distant with respect to the center of rotation 0 of the broach cutter 18 as they vary from rough machining to finish machining tips.

As a result, it can be seen that if the lens 23a, of the image pickup means 23 is preset to be focused, for example, on rough machining tips C1, C2, . . . , it would be possible that as the unitary cutters 18b are rotated, the lens 23a of the image pickup means 23 could be defocused so that a clear image may not ensue.

Such inconvenience is advantageously eliminated in the present embodiment with the focusing adjustment means 27 which, is provided to control the position of the above mentioned mounting table 25 so that it may be displaced towards and away from the broach cutter 18 so as to maintain the distance L of the lens 23a of the image pickup means 23 from each of the tips C1, C2, . . . C3 always constant.

More specifically, the focusing adjustment means 27 has the above mentioned mounting table 25 which is transversely mounted across the paired slides 8 and 8 and displaceable towards away from the broach cutter 18 relative to these slides 8. And, below the mounting table 25 there is arranged rotatably the feed screw 26, that may comprise a ball screw, with its center axis aligned in the direction of displacement of the mounting table 25.

In screw with the feed screw 26 is a nut member 25a which is disposed at the bottom of the mounting table 25. And, coupled to the feed screw 26 at one end thereof, a focusing adjustment motor 28 is attached to the rear face of the cross bar 8a and is capable of being driven to rotate the feed screw 26, thereby displacing the mounting table 25 towards or away from the broach cutter 18 relative to the slides 8.

The focusing adjustment motor 28 is adapted to be controlledly driven by the control means 30.

The control means 30 comprises a turn broach controlling NC (numerical control) unit 31 and the image processing unit 32 designed to process an image picked up by the image pickup means 23. The image processing unit 32 has various tip patterns P1, P2, . . . , Pn, varying in both orientation and shape, stored therein. These stored patterns P1, P2, . . . , Pn are used for the purpose of a pattern matching process with tip data derived from the image pickup means 23. Thus, a tip, C1, C2, . . . , Cn, whose pattern is found to coincide with any of the stored patterns P1, P2, . . . , Pn is identified of its position. In addition, the tip data are subjected to a binary process upon establishing a threshold value from a density distribution in a test region of a particular tip portion as will be described later. Whereupon a tip abnormality for all the tips C1, C2, . . . , Cn may be determined. And, a result of determination is furnished to the NC unit 31, is displayed at a display unit 33 therein and can as required be used to emergency stop the operation of the broach cutter.

The NC unit 31 can also be furnished with a signal representing an angle of rotation of the broach cutter 18 as detected by the rotary angle sensing means 21. This signal is then processed by the NC unit 31 to provide a control signal, which is applied via an amplifier 34 to control the position of the focusing adjustment motor 28 so that it may be displaced so as to maintain the distance L of the lens 23a of the image processing means 23 from each of the positions of tips C1, C2, . . . , and Cn always constant.

On the other hand, the air curtain forming means 24 is located where a header 24a is transversely mounted across a pair of support members 36 and 36 between their forward ends, each of the members upstanding on the mounting table 25 in the form of a reversed L letter.

The header 24a is provided in its lower surface with a plurality of nozzles 24b which are positioned corresponding to the divided image pickup means 23 and adapted to flush out air flows in front of the lenses 23a of the image pickup means 23. To this end, the header 24a is connected at its one end to an air supply source (not shown) via an air delivery conduit 37.

Now, referring to the flow chart shown in FIG. 4 and the timing diagram shown in FIG. 5, an explanation will be given with respect to an operation of the turn broach abnormality sensing apparatus constructed as has so far been described.

A workpiece 3 to be machined with the broach cutter 18 is supported with its opposite ends grasped by the chucks 4 and 4, and is rotated by the workpiece drive motor 7 in the direction indicated by the arrow A in FIG. 1.

Also, the broach cutter 18 is supported by and between the two cutter heads 8 and 8 as attached to their respective rotary shafts 17 and 17 and is drive by the broach cutter drive motor 20 to make an approximately 360 degree rotary motion in the direction indicated by the arrow B in FIG. 1. Thus, with the multiple tip rows $18_1, 18_2, \ldots 18_n$, arranged on the outer peripheral surface of the broach cutter 18 all the journals 3a of the workpiece 3 are machined at the same time.

On the other hand, when the workpiece 3 commences to be machined, the angle of rotary motion of the broach cutter 18 is detected by the rotary angle sensing means 21 to provide a pulse signal as shown in (a) of FIG. 5 which is furnished to the NC unit 31.

As the NC unit 31 acts in step S1 shown in FIG. 4 to count pulse signals furnished from the rotary angle sensing means 21 as depicted in 5(b), of Fig. and in step S2 to compare the number of counts for tip pattern Pn counted with stored data preset for a tip position data Cn.

The stored tip position data represents a data that has preliminarily been registered for each of varying broach cutters 18 with respect to the different positions of the tips C1, C2, . . . , Cn so that the stored tip position of a particular broach cutter 18 in current use may be accessed and called at any time as required for comparison with the number of counts for tip pattern Pn.

For example, in the present embodiment the positions of the first tip C1, the second tip C2 and the last tip Cn are set at 2.3 degrees, 4.5 degrees and 310 degrees, respectively.

If in step 2 the number of count for tip pattern Pn is found to be coincident with the registered position date C1, in step S3 a trigger pulse signal as shown in (c) of FIG. 5 will be issued from a trigger generating circuit in the NC unit 31 and in step S4 the shutter of the image pickup or taking means 23 will be opened as shown in (d) of FIG. 5 to sense an image or take a picture or image of the first tip C1.

The image picked up or taken by the image pickup means 23 of the first tip C1 will in Step S5 be fetched or taken into the image processing unit 32 as shown in (e) of FIG. 5 and will then be image processed in step S6 as shown in (f) of FIG. 5.

The image processing first carries out in step S6 a pattern matching process of an image of the first tip C1 picked up into the image processing apparatus 32 in comparison with the prestored, stored tip patterns P1, P2, . . . , Pn.

A prestored stored tip pattern represents a pattern which has preliminarily been stored and stored for each of the various tips C1, C2, . . . , Cn with respect to its orientation and shape so that a pattern matching process may select, among these stored patterns, P1, P2, . . . , Pn, a particular pattern P1, P2, . . . , Pn found to be coincident with a particular image of the first tip C1 taken or picked up by the image pickup means 23.

The selected storage pattern P1, P2, . . . , Pn and the image of the first tip C1 are registered in position with each other in step S7, a test region will then be set in step 8.

This step, noting that the damage to or the wear of a tip C1, C2, . . . , Cn which occurs in the machining of a workpiece 3 does concentrate at its forward end region, typically sets a forward region of each of the tips C1, C2, . . . and Cn.

When the test region has been so set in step S8, the process goes onto step S9 which is designed to process a density distribution data in the set test region.

Thereafter, a threshold value will be set in step S10 and the density distribution data will be binary processed with reference to the set threshold value in step S11.

In step 12, a binarized density distribution data from step 11 results to provide a pixel number in which can be compared in step S13 with a preliminarily stored reference of determination, thereby permitting any abnormality whatsoever the broach cutter may have suffered to be detected and ascertained.

A preliminarily stored reference of determination is designed to compare preset reference values F1 and F2 with a pixel number In, and then to determine if it is normal or abnormal based on the following criteria:

In<F1 Tool is not abnormal(normal),

F1<In<F2

Tool life is ending and requiring a tool exchange, and

F2<5 In:

Tool is abnormal, requiring a machine emergency stop.

A result of determination in Step 13 is indicated to the NC unit where it is displayed by the display means 33. If F2<In, it is determined that an abnormality has occurred in the tool, requiring the turn broach to be emergently stopped.

On the other hand, the NC unit 31 responds to a signal representing an angle of rotary motion of the broach cutter 18 received from the rotary angle sensing means 21 and provides a control signal which is furnished via the amplifier 34 to the focusing adjustment motor 28.

In response to a control signal received from the NC unit 31, the focusing adjustment motor 28 is controlledly driven to rotate the feed screw 26 so that the distance L of the lenses 23a of the image pickup means 23 from each of the tips C1, C2, . . . , Cn may be maintained constant.

This effectively prevents the image pickup means 23 from being defocused if tips C1, C2, . . . , Cn on the outer peripheral surface of the broach cutter 18 are arranged spirally thereon with respect to the center of rotation 0 and hence allows a clear image to be always obtained of the tips C, C2, . . . , Cn.

Also, air streams flushed out of the nozzles 24b in the air curtain forming means 24 while the workpiece 3 is being machined, provide, ahead of the lenses 23a of the image pickup means 23, an "air curtain" which effectively prevents machining chips and fumes produced in cutting zones and splashes of a cutting medium from adhering to the lenses 23a of the image pickup means 23. This ensures a consistent detection with due precision of an abnormality such as a damage caused to a tip C1, C2, . . . or Cn. Furthermore, arranging the image pickup means 23 at a site opposite to the cutting area of a workpiece 3 across the broach cutter 18 effectively prevents a large cutting chip if happens to be produced while the workpiece is being cut from damaging the image pickup means 23.

It should be noted that while in the embodiment illustrated and described the focusing adjustment means 27 is provided for the image pickup means 23 in the present invention in which the nut member 25a disposed at the mounting table 25 is arranged to be in screw with the feed screw 26 rotated by the focusing adjustment motor 28 to allow the mounting table 25 to be displaced towards and away from the broach cutter 18, an alternative embodiment of the present invention may be adopted in which a cam mechanism is used in place of the feed. screw 26 to displace the mounting table g5 towards and away from the broach cutter 18.

It should also be noted that the use of the image pickup means 23 as having an automatic focusing adjustment function enables a focusing to be adjusted with the mounting table 25 held fixed in position, permitting the tips C1, C2, . . . and Cn on the outer peripheral surface of the broach cutter 18 to be arranged spirally thereon with respect to a center of rotation 0 thereof while consistently providing a clear image of each of these tips.

While the present invention has hereinbefore been set forth with respect to certain illustrative embodiments thereof, it will readily be appreciated by a person skilled in the art to be obvious that many alterations thereof, omissions therefrom and additions thereto can be made without departing from the essence and the scope of the present invention. Accordingly, it should be understood that the present invention is not limited to the specific embodiments thereof set out above, but includes all possible embodiments thereof that can be made within the scope with respect to the features specifically set forth in the appended claims and encompasses all the equivalents thereof.

For example, while the embodiments illustrated and described are directed to a broach cutter comprising a plurality of unitary cutters which are axially coupled together and having a plurality of image pickup means associated with these unitary cutters respectively, it will readily be seen that the present invention may also be embodied with a broach cutter comprising a single unitary cutter as having a single image pickup means associated with the single unitary cutter.

What is claimed is:

1. A turn broach abnormality sensing apparatus for use in a turn broach for cutting a rotating workpiece by rotating a broach cutter that comprises a plurality of unitary cutters axially coupled together, each having a row of tips arranged on a peripheral surface thereof in the form of a helicoid, the apparatus comprising:
   a plurality of image pickup means disposed corresponding respectively to said unitary cutters of the broach cutter;
   a focusing adjustment means operative while said broach cutter is being rotated for maintaining a distance substantially constant between each individual tip on said row of each of said unitary cutters and said image pickup means corresponding thereto; and
   an abnormality sensing means for image processing the image picked up by said image pickup means of each of said individual tips to determine an extent of wear thereof or damage thereto, thereby ascertaining an abnormality of each of the individual tips.

2. A turn broach abnormality sensing apparatus as set forth in claim 1 in which said focusing adjustment means comprises:
   a mounting table for mounting said plurality of image pickup means thereon;
   a drive means for displacing said mounting table towards and away from said broach cutter;
   a rotary angle sensing means for detecting angle of rotary motion of said broach cutter; and
   a control means operative in response to a signal received from said rotary angle sensing means for controlling said drive means so as to maintain the distance between said image pickup means and each individual tip on the tip row of each of said unitary cutters substantially constant.

3. A turn broach abnormality sensing apparatus as set forth in claim 2, further comprising an abnormality identifying means operative in response to a signal received from said rotary angle sensing means for identifying a particular tip where the abnormality has occurred.

4. A turn broach abnormality sensing apparatus as set forth in any one of claims 1 to 3, further comprising an air curtain forming means disposed between said broach cutter and said image pickup means.

5. A turn broach abnormality sensing apparatus as set forth in any one of claims 1 to 3, in which said image pickup means is disposed at a site opposite to where said workpiece is located across said broach cutter.

* * * * *